July 21, 1931.  J. H. PINSON  1,815,362
MOTOR BRACKET FOR CREAM SEPARATORS
Filed Oct. 22, 1928
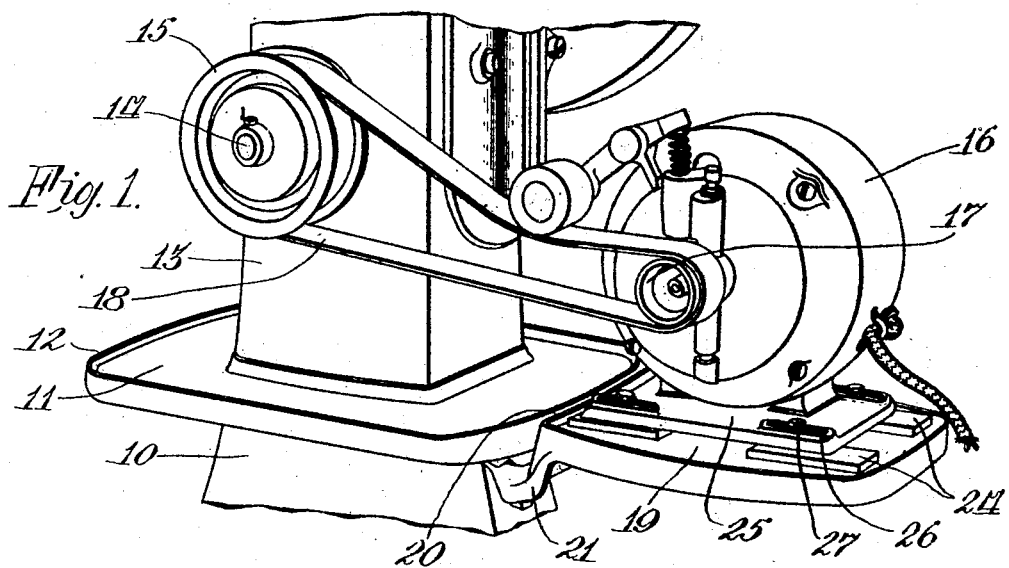
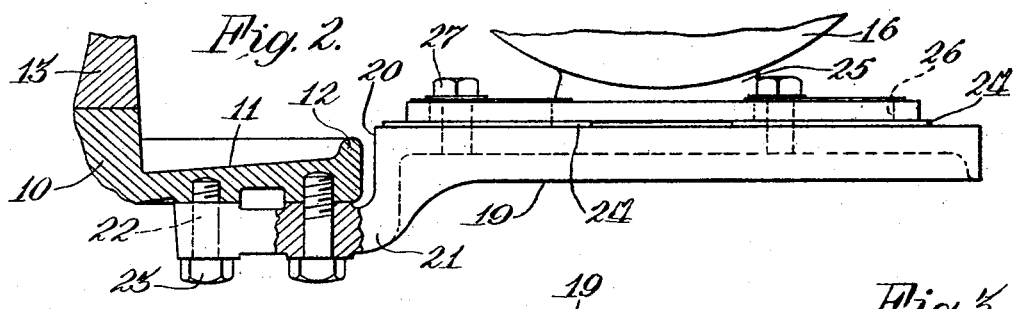
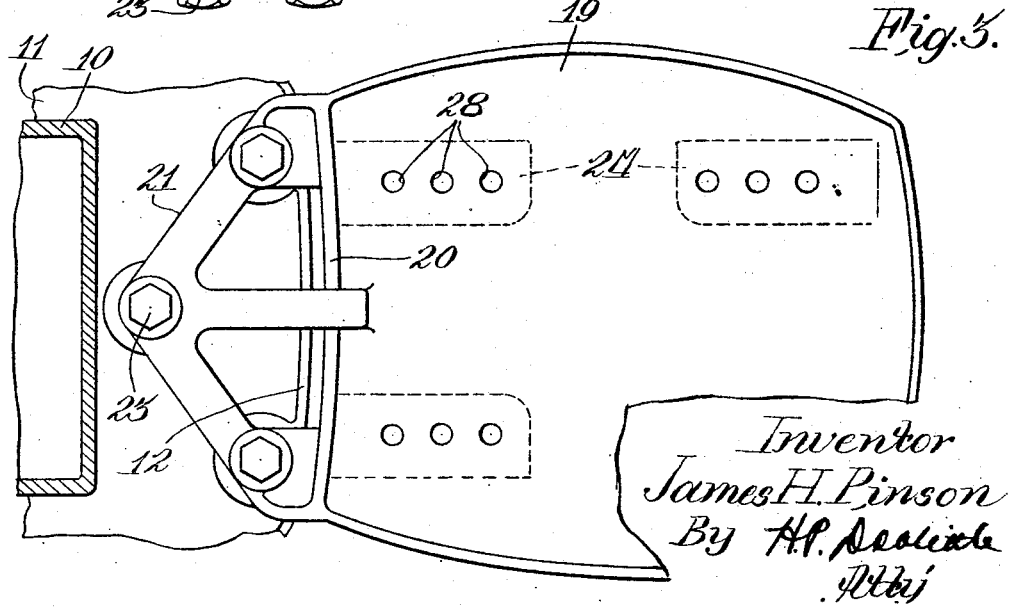
Inventor
James H. Pinson Patented July 21, 1931

1,815,362

UNITED STATES PATENT OFFICE

JAMES H. PINSON, OF RICHMOND, INDIANA, ASSIGNOR TO INTERNATIONAL HARVESTER COMPANY, A CORPORATION OF NEW JERSEY

MOTOR BRACKET FOR CREAM SEPARATORS

Application filed October 22, 1928. Serial No. 314,014.

The invention is a motor carrying bracket or shelf adapted for use as an attachment to a hand driven cream separator for converting the same into a motor driven machine.

Cream separators as now standard in the art are either hand driven or motor driven. Some hand driven machines are provided with a shaft extension protruding outwardly from the gear case and normally covered by a removable shield. This shield may be removed and a pulley may be placed on this shaft extension so that the gearing of the separator may be connected by a belt to an electric motor. Such hand machines, however, are not provided with any convenient means for supporting the motor, and, accordingly, it is the primary object of this invention to provide a simple and efficient motor carrying bracket for a hand type cream separator, so that the same may be quickly converted into a motor driven machine.

Another object is to provide such a motor carrying bracket which can be quickly and securely connected to a skirt on the cream separator frame, and, conversely, one which can quickly be removed, if occasion requires it.

Another object is to provide the detachable bracket or shelf with means for detachably mounting the motor thereon so that the same may be properly lined up to get a straight belt drive between the pulley of the cream separator and a pulley on the electric motor.

Briefly, the invention comprises a bracket or shelf which can be easily and quickly bolted to a hand driven cream separator of the type having a skirt, which skirt is utilized as a connecter means to receive the bracket of this invention, all as will later more fully appear.

In the drawings illustrating this invention,—

Figure 1 is a general, perspective view showing a portion of the cream separator with its skirt and the motor carrying bracket of this invention connected thereto;

Figure 2 is a general, end elevational view, partly in section, of the bracket and the manner of its connection to the skirt; and Figure 3 is a bottom plan view of the bracket and its connection to the cream separator skirt.

The cream separator shown is of the hand driven type having a base 10, a skirt 11 provided with a peripheral flange 12 surrounding the gear casing 13, from which protrudes the main drive shaft 14, which is normally hand driven.

It is desired to convert this hand driven machine into a motor driven machine. Accordingly, a cover plate, not shown, is removed to expose the protruding end of the shaft 14 and a pulley 15 is mounted thereon. The problem now is to provide a support for an electric motor 16 having a pulley 17 which is designed to be connected by means of a belt 18 to drive the pulley 15 and the cream separator shaft 14.

The skirt 11, of course, is not of sufficient size in the hand type machines to support the motor 16 and, additionally, it is not desirable to make this skirt large enough to enable the same to support a motor, because in a great many instances, and perhaps in the majority of the cases, the user is satisfied to operate his machine by hand. It, therefore, is necessary to attach a supporting bracket in the nature of an extension to this skirt 11, which will carry the motor 16.

Accordingly, a bracket or shelf 19 is provided which has an edge 20 which will fit the conformation of the adjacent side of the skirt 11 and particularly its flange 12. The top part of the shelf 20 is arranged to lie in the same horizontal plane with the top side of the skirt 11. As it is advantageous to keep the top side of the skirt 11 clear of all obstruction, it is important that the bracket or shelf 19 be secured to the under side of the skirt 11, and thus it is that that end of the bracket 19 adjacent the skirt 11 is provided with a downturned triangular extension 21 provided with three spaced bolt holes 22, one at each angle, to receive screws 23, which are screwed into openings on the under side of the skirt 11, as clearly shown in Figure 2. The top side of the motor carrying bracket or shelf 19 is provided with four spaced plates or blocks 24 to which is connected the base 25 of the electric motor 16, said base having therein elongated slots 26 at each corner, so that screws 27 may be passed through these slots 26 and into the shelf 19, as shown in Figure 2, to secure the motor 16 to said shelf 19. The slots 26 permit placing of the screws 27 in any one of a series of spaced screw receiving holes 28 in the plate 19 to adjustably mount the motor 16 in that position on the bracket where its pulley 17 will best line up with the pulley 15 to make a straight drive for the belt 18.

It is of interest to note that the triangular extension provides a trussed connecter for the plate 19 and presents a three point connection which is strong, even though the triangular extension is for the greater part open, as appears in Figure 3. The parts 12 and 20, as shown in Figure 2, are purposely spaced apart, so that vibrations from the cream separator body cannot be directly transmitted to the motor 16, and, vice versa, from the said motor to the cream separator. As the tri-part extension provides three spaced points of connection and is of open skeleton formation, the exchange of these vibrations is further minimized.

From this detailed description it must now be clear that a simple bracket attachment has been provided by this invention which will readily enable the owner of a hand driven cream separator quickly to convert the same into a motor driven machine. The extension 21 and screws 23 make for a secure and clean looking clamping job, which is so desirable.

It is the intention to cover all such changes and modifications of this invention as do not materially depart therefrom, as is indicated by the scope of the following claim.

What I claim is:

In a cream separator having a skirt, an attachment therefor comprising a shelf adapted for carrying a motor, means for connecting the shelf to the skirt in a manner to leave a space between adjacent edges of the shelf and skirt, said means comprising a tri-part trussed skeletonized extension of the shelf extending beneath the skirt and providing three spaced points of attachment, and means at each point for securing the extension to the under side of the skirt.

In testimony whereof I affix my signature.

JAMES H. PINSON.